Jan. 12, 1960  K. W. COUCH  2,920,750
REVERSIBLE TRAINING IDLER
Filed Dec. 6, 1957
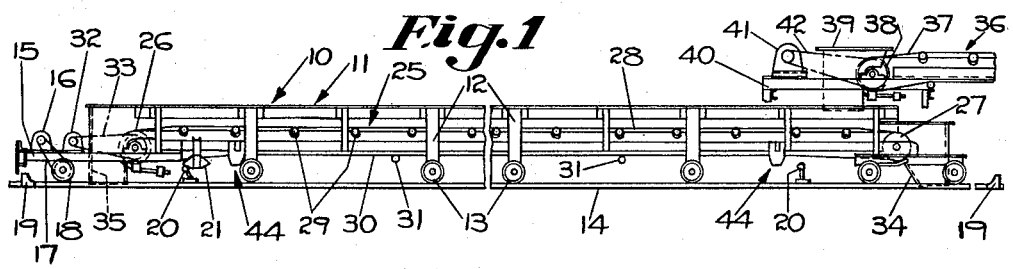
Fig. 1
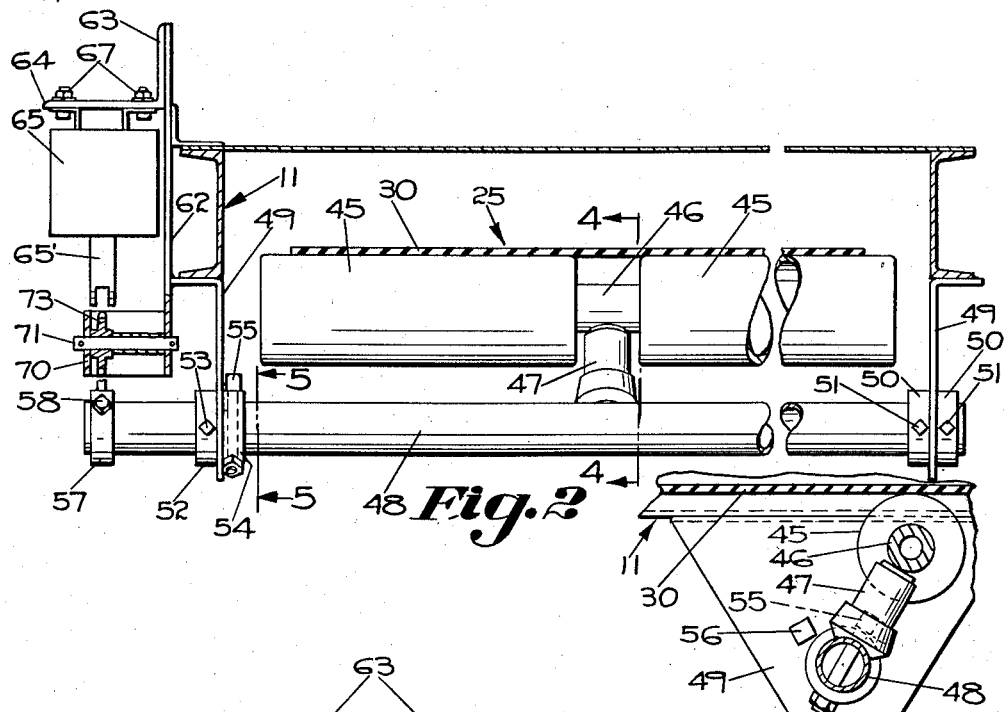
Fig. 2
Fig. 4
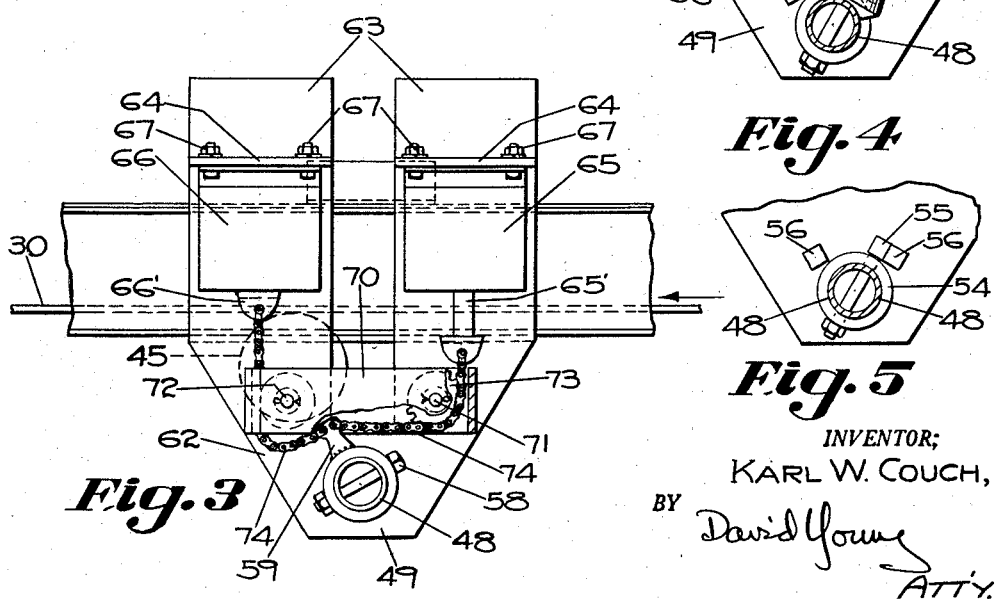
Fig. 3
Fig. 5
INVENTOR;
KARL W. COUCH,
BY David Young
ATT'Y.

United States Patent Office 2,920,750
Patented Jan. 12, 1960

2,920,750
REVERSIBLE TRAINING IDLER

Karl W. Couch, Columbus, Ohio, assignor to The Jeffrey Manufacturing Company, a corporation of Ohio Application December 6, 1957, Serial No. 701,113

6 Claims. (Cl. 198—202)

This invention relates to training idlers for supporting and guiding a run of a conveyor belt and, more particularly, to such an idler which is adapted for use with a belt conveyor which may be operated in opposite directions, there being provided means for reversing the training idler in accordance with the direction of travel of the conveyor belt.

It is the prime object of the invention to provide an improved training idler for a belt conveyor, which is adapted to support and guide a run of the conveyor belt.

It is another object of this invention to provide an improved training idler for a belt conveyor that is adapted to be operated in opposite directions, and in which the training idler can be reversed in accordance with the direction of travel of the conveyor belt.

It is a further object of the invention to provide an improved training idler for a belt conveyor that is adapted to be operated in opposite directions, in which the conveyor includes a reversible motor for operating the conveyor belt in opposite directions, and the training idler includes means connected to the reversible motor for reversing the training idler in accordance with the direction of travel of the conveyor belt.

It is also an object of this invention to provide an improved training idler for supporting and guiding a run of a conveyor belt, in which the training idler is supported on an upright pivot axis which is inclined in the direction of travel of the conveyor belt, the conveyor belt being operated by a reversible motor for travel in opposite directions, and there being provided solenoid operating means connected to the reversible motor for reversing the training idler in accordance with the direction of travel of the conveyor belt, to incline the pivot axis of the training idler in the direction of travel of the conveyor belt.

It is still another object of the instant invention to provide an improved shuttle belt conveyor which is adapted to ride back and forth along a track to discharge material along the full length of the track, the conveyor belt being driven in opposite directions and including a reversible training idler for supporting and guiding a run of the conveyor belt, the training idler being supported on an upright pivot axis which is inclined in the direction of travel of the conveyor belt, and including means to reverse the direction of inclination of the pivot axis in accordance with the direction of travel of the conveyor belt.

Other objects of the invention will appear hereinafter, the novel features and combinations being set forth in the appended claims.

In the accompanying drawings:

Fig. 1 is a side elevational view of a shuttle belt conveyor embodying the instant invention;

Fig. 2 is a transverse elevational view of a section of the shuttle belt conveyor showing the reversible training idler;

Fig. 3 is a side elevational view, partially in section, of a portion of the shuttle belt conveyor showing the means for reversing the training idler;

Fig. 4 is a sectional view of the training idler taken on the line 4—4 in Fig. 2; and Fig. 5 is a sectional view showing the stop means for limiting the arc of oscillation of the training idler, taken on the line 5—5 in Fig. 2.

Referring to the drawings there is illustrated in Fig. 1 a shuttle belt conveyor 10 comprising a longitudinally extending main frame 11, formed with a plurality of upright supporting legs 12 spaced along the length of the conveyor 10 on each side of the main frame 11. At the bottom of each of the supporting legs 12 there is provided a wheel 13, these wheels 13 being adapted to ride on longitudinally extending tracks 14. The shuttle belt conveyor 10 is thereby adapted to ride along the tracks 14 from one end thereof to the other in opposite directions and, as will appear hereinafter, the shuttle belt conveyor 10 is adapted to discharge material between the tracks 14 all along the length thereof, this material being received in a bin or like compartment located below the tracks 14.

At one end of the main frame 11 there is formed a platform 15 on which there is supported a reversible propelling motor 16 which is connected by a chain or belt drive 17 to propelling wheels 18 disposed below the platform 15 in engagement with the tracks 14. The propelling motor 16 may be operated in opposite directions for driving the propelling wheels 18 in opposite directions, to propel the shuttle belt conveyor 10 in opposite directions along the tracks 14. Stops 19 are provided at opposite ends of the tracks 14 to limit the movement of the shuttle belt conveyor along the tracks 14.

Near each end of the tracks 14 there is provided a limit switch 20 which is actuated by a double cam 21 secured to the main frame 11. As the shuttle belt conveyor 10 nears the end of the tracks 14 the double cam 21 engages the limit switch 20 and operates it to reverse the propelling motor 16, causing the latter to begin driving the wheel 18 in the opposite direction, and thereby propelling the shuttle belt conveyor 10 in the opposite direction along the tracks 14. In approaching the end of the tracks 14 the cam element 21 actuates the limit switch 20 and overrides the switch. When the shuttle belt conveyor 10 returns in the opposite direction the cam 21 again contacts the limit switch 20, restoring the limit switch 20 to its initial position, and again overriding the switch 20. It will be understood that similar limit switches are provided at opposite ends of the tracks 14, and that these operate identically to reverse the direction of the shuttle belt conveyor 10 when it reaches either end of the tracks 14.

The shuttle belt conveyor 10 further comprises an endless conveyor belt 25 which is trained about a driving pulley 26 and an idler pulley 27 disposed at opposite ends of the shuttle belt conveyor 10 and rotatably supported on the main frame 11. The load carrying run 28 of the conveyor belt 25 is supported by a plurality of troughing idlers 29 extending laterally of the conveyor belt 25 and supported on the main frame 11. The troughing idlers 29 form the load carrying run 28 of the conveyor belt 25 in a troughed configuration to center the material laterally of the conveyor belt 25, and to thereby prevent the material falling over the side edges of the conveyor belt 25. The return run 30 of the conveyor belt 25 is supported on a plurality of return idlers 31, each of which is rotatably mounted on the main frame 11. The return idlers 31 are straight and fewer in number than the troughing idlers 29, since these idlers are not required to support any load other than the weight of the conveyor belt 25 itself.

At the motor end of the main frame 11 the platform 15 supports a motor 32 for driving the conveyor belt 25. The motor 32 is reversible, and is connected by a belt or chain drive 33 to the driving pulley 26, to rotate this pulley and thereby drive the conveyor belt 25. The motors 16, 32 are electrically connected so as to be reversible together, since the direction of travel of the conveyor belt 25 must be in accordance with the direction of travel of the shuttle belt conveyor 10 along the tracks 14.

A chute 35 is provided at one end of the main frame 11 adjacent the driving pulley 26, and the material which discharges from the conveyor belt 25 over the driving pulley 26 falls into the chute 35, the latter being placed between the tracks 14, so that the material discharged by the shuttle belt conveyor 10 is guided by the chute 35 between the tracks 14, and into the bin or other compartment that is located therebelow. At the other end of the main frame 11 there is provided another chute 34, which is located adjacent the idler pulley 27 to guide the material discharged by the shuttle belt conveyor 10 over the pulley 27 between the tracks 14, as is the case with the chute 35. It will be understood that one or the other of the chutes 34, 35 will be in use depending on the direction of travel of the load carrying run 28 of the conveyor belt 25.

The material is delivered to the shuttle belt conveyor 10 by a feeder belt conveyor 36 which is disposed above the shuttle belt conveyor 10. The feeder belt conveyor 36 comprises a conveyor belt 37 which is trained about a head pulley 38, the material discharging from the feeder belt conveyor 36 over the head pulley 38. A chute 39 is disposed adjacent the head pulley 38, and the material discharged by the conveyor belt 37 falls into the chute 39 and is guided thereby onto the load carrying run 28 of the conveyor belt 25. The feeder belt conveyor 36 includes a platform 40 on which there is supported a motor 41, which is connected by a belt or chain drive 42 to the head pulley 38 for rotating the latter to thereby drive the conveyor belt 37.

At each end of the shuttle belt conveyor 10 there is provided a training idler assembly 44 which is adapted to support and guide the return run 30 of the conveyor belt 25. The training idler assembly 44 is illustrated in detail in Figs. 2 to 5. The training idler assembly 44 comprises a pair of laterally extending idler rolls 45 which are rotatably mounted on a laterally extending dead shaft 46. The dead shaft 46 is supported by a pivot assembly 47, disposed on the upright axis which is inclined in the direction of travel of the return run 30 of the conveyor belt 25. The structure of the idler rolls 45, the dead shaft 46, and the pivot assembly 47 is not illustrated in detail herein for the reason that this structure is well-known to those skilled in the art, and may take any of several accepted forms, such as that illustrated in Patent No. 2,399,913, issued May 7, 1946, for Self-Aligning Belt Idler.

The pivot assembly 47 is secured, as by welding, to an oscillatable support comprising a transversely extending rock shaft 48 which is supported by side plates 49 on the main frame 11. At the right-hand end of the rock shaft 48, as viewed in Fig. 2, there is secured to the shaft 48 a pair of spacing collars 50, disposed one on either side of the side plate 49 to prevent axial movement of the rock shaft 18 relatively to the main frame 11. The spacing collars 50 are secured to the rock shaft 48 by means of set screws 51, and serve the additional function of spacing the training idler assembly laterally of the main frame 11. For proper operation of the training idler assembly 44 it is required that it be symmetrically located with respect to the longitudinal center line of the return run 30 of the conveyor belt 25.

At the left-hand side of the main frame 11, as viewed in Fig. 2, a spacing collar 52 is secured to the rock shaft 48, by a set screw 53, on the outside of the side plate 49. At the opposite side of the side plate 49 a spacing collar 54 is secured to the rock shaft 48 by a square head bolt 55, which extends diametrically through the collar 54 and the rock shaft 48. A pair of stop elements 56 are disposed on the inside of the side plate 49 and secured thereto as by welding, these stop elements 56 being spaced in an arc, and located adjacent the collar 54, so that the square head bolt 55 will abut the stop elements 56 when the rock shaft 48 is oscillated, and act to limit the arc of oscillation of the rock shaft 48.

The rock shaft 48 extends beyond the side plate 49 and a collar 57 is secured thereto by a bolt 58 extending diametrically through the rock shaft 48. A radially extending arm 49 is welded to the collar 57, serves as a lever for oscillating the rock shaft 48 within the arc defined by the stops 56, to dispose the axis of the pivot assembly 47 with an inclination in the direction of travel of the return run 30 of the conveyor belt 25.

At the side of the main frame 11 there is secured a supporting plate 62 which carries the operating mechanism for oscillating the rock shaft 48. An angle element 63 is secured to the supporting plate 62, as by welding, one such angle element 63 being provided at each side of the supporting plate 62, as seen in Fig. 3. Each angle element 63 has a leg 64 which extends laterally from the plane of the supporting plate 62. Solenoids 65, 66 are secured one to each of the legs 64 by means of bolts 67. The solenoids 65, 66 are disposed with their armatures 65', 66' directed downwardly.

A plate 70 having a channel section, is secured to the supporting plate 62, as by welding, and forms therewith a boxlike compartment. A pair of shafts 71, 72 are each supported by the supporting plate 62 and the plate 70 and extend therebetween in the box-like compartment. Each shaft 71, 72 rotatably supports a sprocket wheel 73. Each of the solenoid armatures 65', 66' is formed with a bifurcated end in which there is secured one end of a flexible chain 74, the chain 74 being secured intermediate its ends to the actuating arm 59. The chain 74 is adapted to engage with the teeth of the sprocket wheels 73, and force is applied to the actuating arm 59 through the chain 74, the latter being pulled by one or the other of the armatures 65', 66' of the solenoids 65, 66.

Referring to Fig. 3, the return run 30 of the conveyor belt 25 is seen to be traveling towards the left, and this may be considered to be the forward direction of travel of the conveyor belt 25. The pivot assembly 47 of the training idler is disposed with its axis inclined in a forwardly direction, corresponding to the direction of travel of the conveyor belt 25. In operation of the conveyor belt 25, when the return run 30 thereof shifts to one side or the other of the longitudinal centerline, an unbalanced force is applied to the idler rolls 45 of the training idler assembly 44, causing the idler rolls 45 and their shaft 46 to swing on the axis of the pivot assembly 47, thereby training the return run 30 of the conveyor belt 25 back to a longitudinally centered position.

The solenoids 65, 66 are connected in circuit with the reversible motors 16, 32 and when the latter are reversed to drive the conveyor belt 25 in a reverse direction, again with reference to Fig. 3, the solenoid 65 is energized, drawing its armature 65' upwardly. This applies a force to the chain 74 which is connected between the armature 65' and the operating arm 59. The force is transmitted through the chain 74 to the operating arm 59, thereby oscillating the rock shaft 48 in a clockwise direction, shifting the training idler assembly 44 to position it with the axis of the pivot assembly 47 inclined in the reverse direction of travel of the return run 30 of the conveyor belt 25. The solenoids 65, 66 have a stroke which is only long enough to oscillate the rock shaft 48 beyond its center position, through an arc which is less than that defined by the stops 56. Thus, in oscillating the rock shaft 48 to shift the training idler assembly 44 for reverse travel of the conveyor belt 25, the solenoid 65 will swing the rock shaft 48 beyond its center position to the limit of the stroke of the armature 65'. The rock shaft 48 will complete its oscillating movement by the weight of the training idler assembly 44, to the limit permitted by the stop 56, the square headed bolt 55 engaging the stop 56 to limit the swinging movement of the rock shaft 48. The free movement of the rock shaft 48 and the training idler assembly 44 will place slack in the chain 74 secured to the armature 65', while the chain 74 secured to the armature 66' of the solenoid 66 will be drawn taut around the sprocket 73, thereby conditioning the mechanism for a subsequent reversal of the training idler assembly 44.

By the instant invention there is provided a reversible training idler for supporting and guiding a conveyor belt, that is operative in either direction of travel of the conveyor belt. The operating means for reversing the training idler is connected to the reversible driving means that operates the conveyor belt in opposite directions, so that the training idler is automatically reversed when the direction of travel of the conveyor belt is reversed. While the invention has been illustrated herein as applied to a return idler, it will be understood by those skilled in the art that the invention is applicable as well to troughing idlers.

Obviously those skilled in the art may make various changes in the details and arrangements of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In a conveyor comprising an endless belt, a reversible motor for driving the belt in forward and reverse directions, a training idler supporting and guiding a run of the belt comprising, idler roll means extending transversely of the belt, pivot means disposed on an upright axis inclined in the direction of forward travel of the belt pivotally mounting the idler roll means on said axis, a support for the training idler, means mounting said support for oscillation, solenoid operating means connected to said support for oscillating said support to shift the training idler and the axis of the pivot means to incline said axis in the reverse direction of travel of the conveyor belt, said solenoid operating means being connected to the motor to shift the training idler when the motor is reversed.

2. In a conveyor comprising an endless belt, a reversible motor for driving the belt in forward and reverse directions, a training idler supporting and guiding a run of the belt comprising, idler roll means extending transversely of the belt, pivot means disposed on an upright axis inclined in the direction of forward travel of the belt pivotally mounting the idler roll means on said axis, a support for the training idler, means mounting said support for oscillation, operating means for oscillating said support to shift the training idler and the axis of the pivot means to incline said axis in the reverse direction of travel of the conveyor belt, said operating means comprising a pair of solenoids mechanically connected to the training idler support to oscillate said support, said solenoids being alternately operable to shift the training idler to its forward or reverse position, said solenoids being connected to the motor circuit and being alternately operated by the motor circuit in accordance with the direction of operation of the motor to shift the training idler when the motor is reversed.

3. In a conveyor comprising an endless belt, a reversible motor for driving the belt in forward and reverse directions, a training idler supporting and guiding a run of the belt comprising, idler roll means extending transversely of the belt, pivot means disposed on an upright axis inclined in the direction of forward travel of the belt pivotally mounting the idler roll means on said axis, a support for the training idler, means mounting said support for oscillation, solenoid operating means for oscillating said support to shift the training idler and the axis of the pivot means to incline said axis in the reverse direction of travel of the conveyor belt, stop means limiting the arc of oscillation of the support and fixing the forward and reverse positions of the training idler, said solenoid operating means being connected to the motor circuit to shift the training idler when the motor is reversed.

4. In a conveyor comprising an endless belt, a reversible motor for driving the belt in forward and reverse directions, a training idler supporting and guiding a run of the belt comprising, idler roll means extending transversely of the belt, pivot means disposed on an upright axis inclined in the direction of forward travel of the belt pivotally mounting the idler roll means on said axis, a support for the training idler, means mounting said support for oscillation, an operating arm on said support, solenoid operating means for oscillating said support to shift the training idler and the axis of the pivot means to incline said axis in the reverse direction of travel of the conveyor belt, means connecting said solenoid operating means to said arm, said solenoid operating means being connected in circuit with the motor to shift the training idler when the motor is reversed.

5. In a conveyor comprising an endless belt, a reversible motor for driving the belt in forward and reverse directions, a training idler supporting and guiding a run of the belt comprising, idler roll means extending transversely of the belt, pivot means disposed on an upright axis inclined in the direction of forward travel of the belt pivotally mounting the idler roll means on said axis, a support for the training idler, means mounting said support for oscillation, flexible pulling means connected to said support and directed forwardly and rearwardly therefrom, operating means connected to said flexible pulling means to apply a force to the support in either a forward or rearward direction to oscillate said support and to shift the training idler and the axis of the pivot means to incline said axis in the reverse direction of travel of the conveyor belt, stop means defining the limits of the arc of oscillation of said support, said arc of oscillation being greater than the arc through which the support is oscillated by the flexible pulling means, the shifting movement of said support being initiated by the flexible pulling means and completed under the weight of the training idler, said operating means being connected to the motor to shift the training idler when the motor is reversed.

6. In a shuttle belt conveyor comprising a main frame, head and tail pulleys on the main frame, a conveyor belt trained about the head and tail pulleys on the main frame, means for propelling the main frame back and forth to discharge material from the belt along the path of travel of the main frame, a reversible motor for driving the belt in forward and reverse directions in accordance with the direction of travel of the main frame, a training idler supporting and guiding a run of the belt comprising, idler roll means extending transversely of the belt, pivot means disposed on an upright axis inclined in the direction of forward travel of the belt pivotally mounting the idler roll means on said axis, a support for the training idler, means mounting said support for oscillation, solenoid operating means for oscillating said support to shift the training idler and the axis of the pivot means to incline said axis in the reverse direction of travel of the conveyor belt, said solenoid operating means being connected to the motor circuit to shift the training idler when the motor is reversed.

References Cited in the file of this patent
UNITED STATES PATENTS 1,973,095    Muller  ------------------ Sept. 11, 1934
2,399,913    Dodge  ------------------ May 7, 1946